United States Patent [19]
Martin et al.

[11] Patent Number: 5,249,846
[45] Date of Patent: Oct. 5, 1993

[54] WHEEL RIM MADE OF COMPOSITE MATERIALS FOR CYCLES AND THE LIKE

[76] Inventors: Pierre A. Martin, Quartier Les Roches, Loriol, France, 26270; Christian Pascaud, 8, rue Jules Ferry, Le Pouzin, France, 07250; Jean-Marie Riffard, 7, Les Charmilles, Livron, France, 26250

[21] Appl. No.: 830,913
[22] Filed: Feb. 4, 1992

[30] Foreign Application Priority Data

Feb. 4, 1991 [FR] France ................. 91 01412

[51] Int. Cl.⁵ ..................... B60B 5/00; B60B 21/00
[52] U.S. Cl. ............................ 301/64.7; 301/95
[58] Field of Search ..................... 301/95, 64.7

[56] References Cited

U.S. PATENT DOCUMENTS

| | | | |
|---|---|---|---|
| 4,150,854 | 4/1979 | Lohmeyer | 301/58 |
| 4,741,578 | 5/1988 | Viellard | 301/63 PW |
| 4,995,675 | 2/1991 | Tsai | 301/63 PW |
| 5,080,444 | 1/1992 | Hopkins et al. | 301/63 PW X |

FOREIGN PATENT DOCUMENTS

| | | | |
|---|---|---|---|
| 869745 | 1/1978 | Belgium . | |
| 2344411 | 10/1977 | France . | |
| 0081801 | 4/1986 | Japan | 301/58 |
| 2051700 | 1/1981 | United Kingdom | 301/98 |
| 2097729 | 11/1982 | United Kingdom . | |

*Primary Examiner*—Russell D. Stormer
*Attorney, Agent, or Firm*—Bacon & Thomas

[57] ABSTRACT

A wheel rim, made of composite materials, for cycles and the like, is disclosed, comprising at least two adjacent box-like structures presenting a common wall and each constituted by a core of a material of cellular structure and by an envelope of rigid character, based on composite textiles of impregnated and polymerized synthetic fibers closely surrounding the core to which it is bonded, one of the box structures constituting a rim body, while the other defines an outer peripheral rim section intended to mountably recline a tire. The invention is particularly applicable to racing cycle wheels.

7 Claims, 4 Drawing Sheets

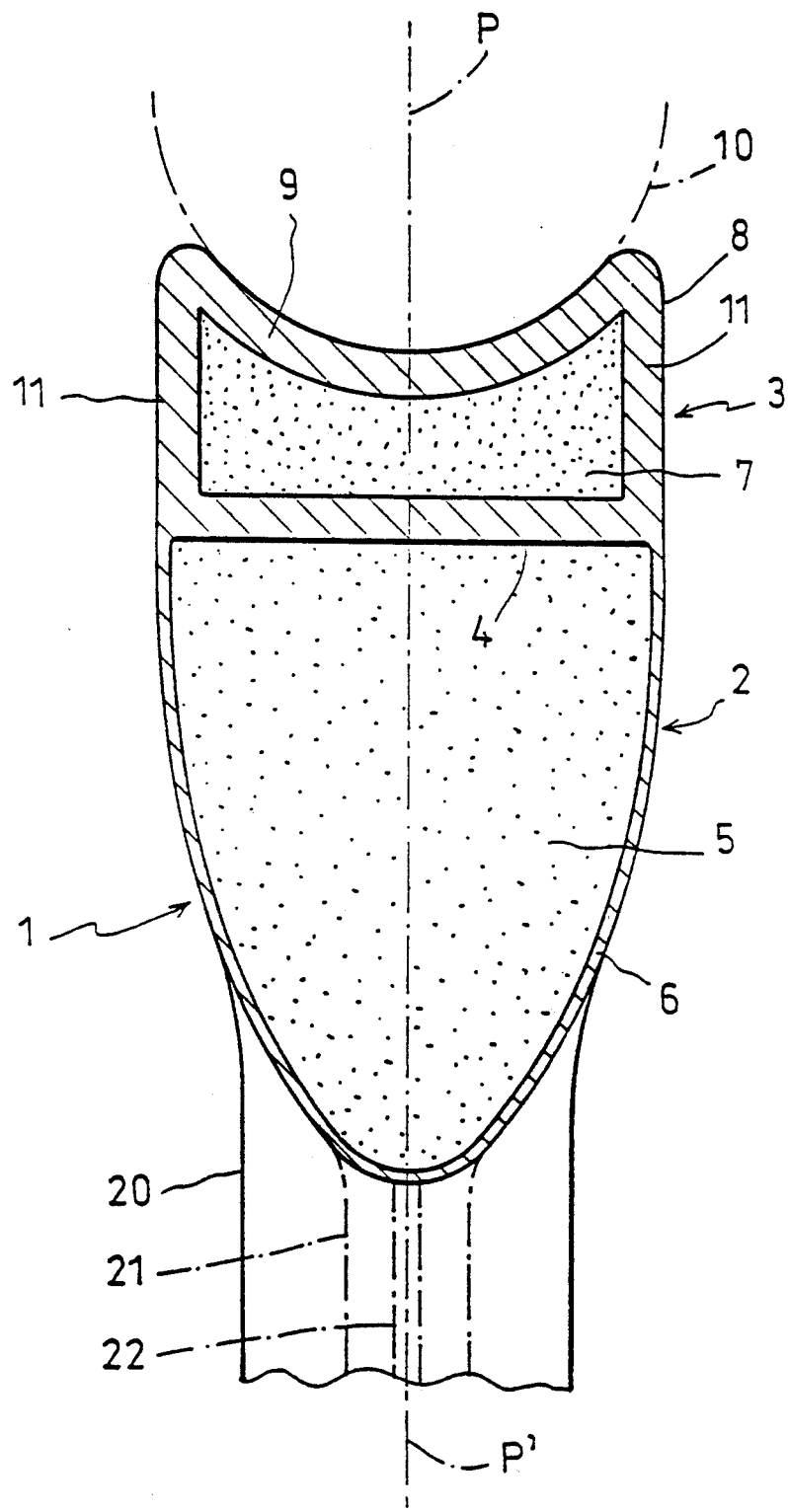
fig_1

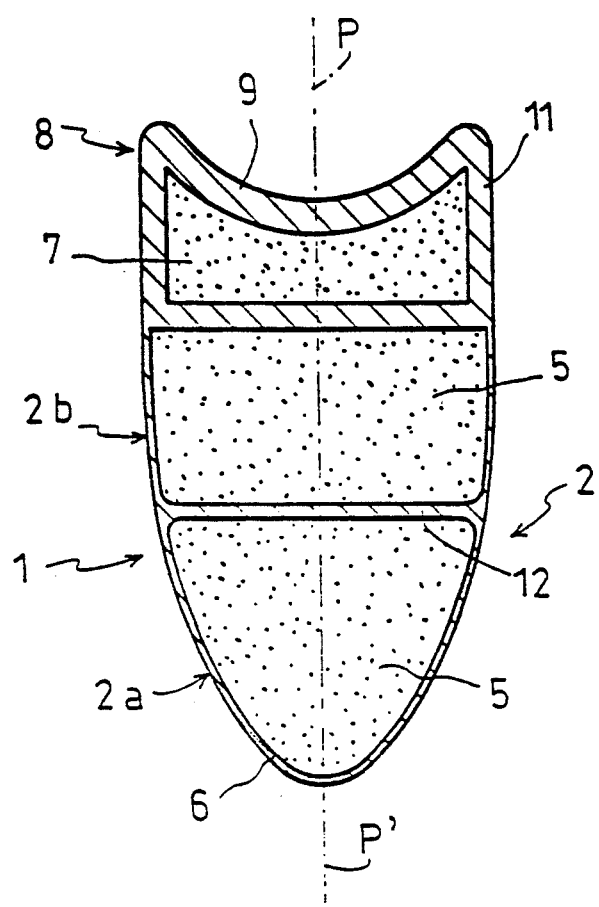
fig_2
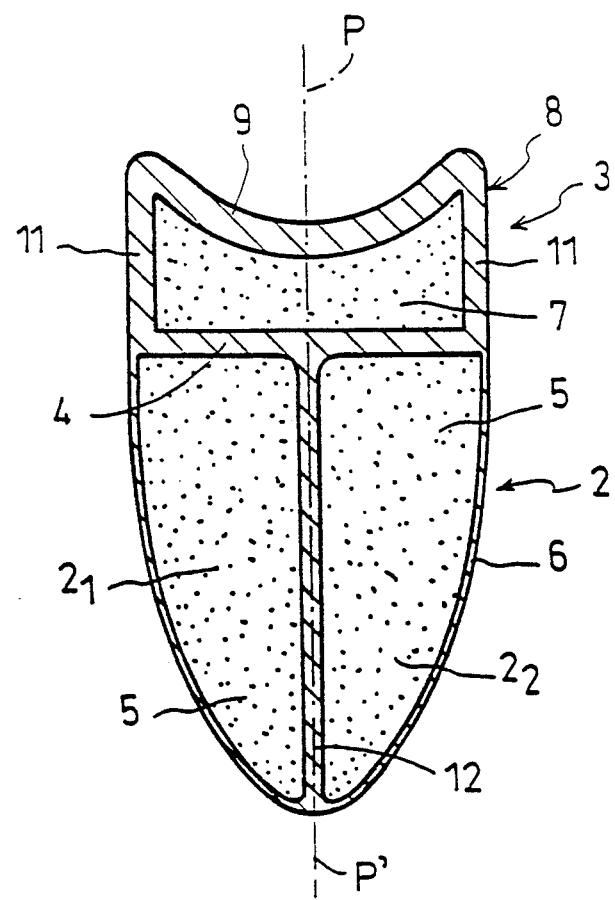
fig_3

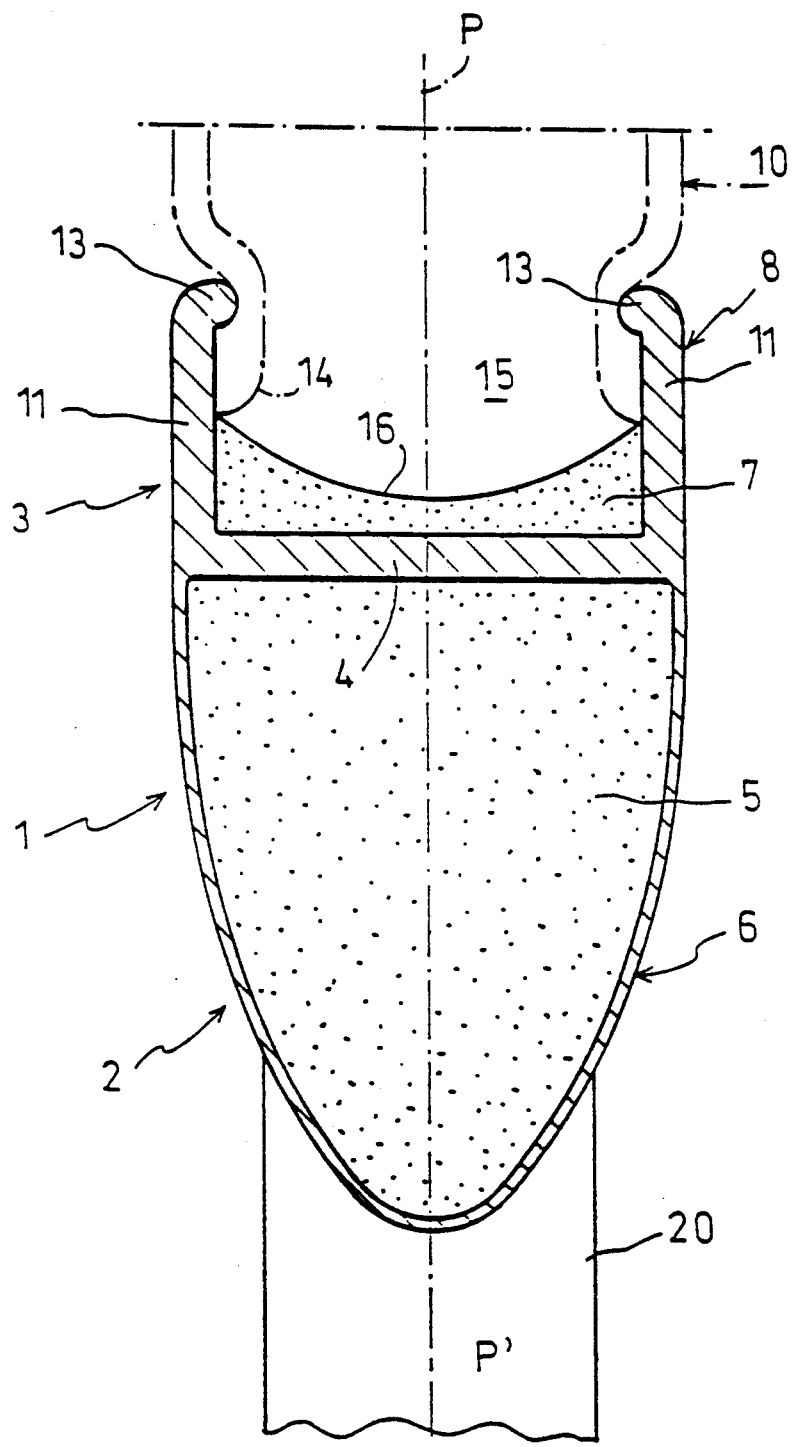
fig_4

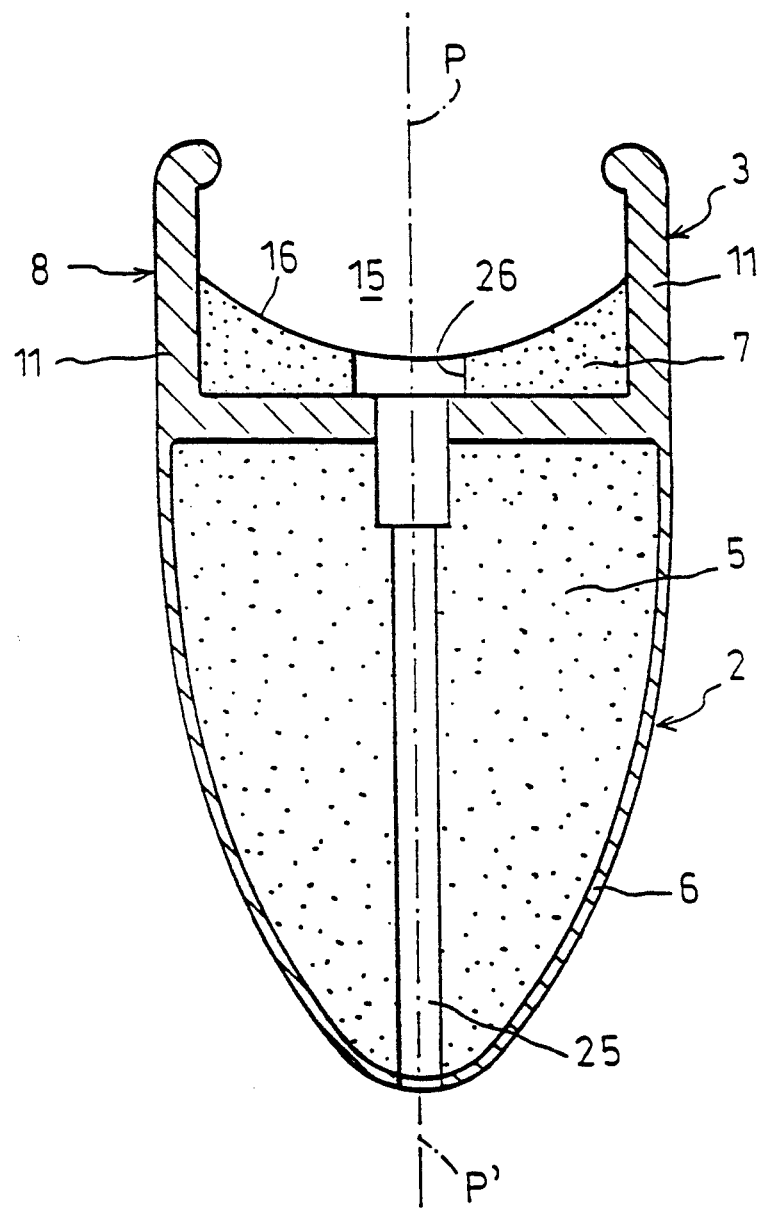
fig_5

5,249,846

WHEEL RIM MADE OF COMPOSITE MATERIALS FOR CYCLES AND THE LIKE

FIELD OF THE INVENTION

The present invention relates to the domain of cycles in general, i.e. velocipedes, bicycles, even mopeds.

The invention aims more particularly at improvements in the constitution of the wheels of such vehicles.

BACKGROUND OF THE INVENTION

Wheels of cycles and the like conventionally comprise a hub, an intermediate connecting part and a rim defining a section adapted to support and retain a peripheral tire, whether the latter be of the solid or inflatable type.

Ordinarily, such wheels are constructed from metal pieces shaped specifically for the intrinsic function of the three constituent elements.

Although constructions with a hub, spokes or fairing and a metallic sectioned rim have given satisfaction, it has been found that they did not respond positively to the requirements of performances, due either to their weight, to their suppleness or, on the contrary, to their high rigidity.

It is to that end that, among a certain number of solutions of improvements, a construction has appeared, based on synthetic material including, most often, a metal hub or hub casing, embedded in a body of the fairing type with walls which are parallel or convergent with respect to the plane of the wheel. Such a fairing is most often made from composite materials including two walls based on impregnated and polymerized fabric reinforcing and stiffening a structural core of foam, generally of the closed cell type. Such a wheel is completed by a belt or hoop defining an outer profile of a rim most often allowing a glued tire to be fitted.

Such a construction makes it possible to obtain a light, resistant wheel which, however, presents two drawbacks preventing it from being marketed on a large scale.

The first follows from the dynamic reaction of the wheel in movement and, more particularly, from its sensitivity with respect to side winds, due to the presence of the fairing.

The second is economic and follows from the high cost of producing such a wheel.

It should, in addition, be indicated that such a wheel, despite the presence of the inflatable tire, is characterized by a certain stiffness often incompatible with the domains of use when not racing.

It is an object of the invention to overcome the drawbacks set forth hereinabove by proposing a novel wheel rim structure of composite materials, more particularly adapted for cycles and the like and which can be produced at a reasonable cost price for all domains of use and application, and to provide a particularly robust and reactive rim, especially of considerable solidity and lightness never attained up to the present time.

Another object of the invention is to propose a novel rim structure which may be employed equally well for a wheel with spokes, rods, and even fairings, and to receive tubeless or inner-tube type tires provided that the basic structure has been slightly modified.

SUMMARY OF THE INVENTION

To that end, the wheel rim made of composite materials, for cycles and the like, is characterized according to the invention in that it comprises at least two adjacent box-like structures presenting a common wall and each constituted by a core of a material of cellular structure and by an envelope of rigid character, based on composite textiles of impregnated and polymerized synthetic fibers closely surrounding the core to which it is bonded, one of the box structures constituting a rim body, whilst the other defines an outer peripheral rim section intended to mountably receive a tire.

The invention also relates, by way of novel industrial product, to a wheel for cycles and the like, comprising a rim according to the invention.

BRIEF DESCRIPTION OF THE DRAWINGS

The invention will be more readily understood on reading the following description with reference to the accompanying drawings, in which:

FIG. 1 is a partial transverse section of the rim according to the invention.

FIGS. 2 and 3 are partial transverse sections illustrating two variant embodiments.

FIG. 4 is a partial transverse section showing, on a larger scale, another embodiment of the rim.

FIG. 5 is a view similar to FIG. 4, showing a possible detail of embodiment of the rim.

DETAILED DESCRIPTION OF THE DRAWINGS

Referring now to the drawings and to the first embodiment illustrated in FIG. 1, the rim, generally designated by reference 1, is made of composite materials and presents in transverse or radial cross section a structure composed of two adjacent box-like structures 2 and 3, separated by a common wall 4 and respectively defining a rim body and a rim section.

The box structure 2 comprises a core 5 of a material of cellular structure, with closed cells, for example made of rigid polycryinide foam. The core 5 is closely surrounded by an envelope 6 partly forming the common wall 4 and entirely surrounding the core 5 to which it is closely bonded. The envelope 6 is preferably constituted from textiles of glass and carbon fibers, impregnated with a thermosetting resin polymerized to give the envelope 6 a rigid character. The thickness of the envelope is preferably included between 0.5 and 1 millimeter, a thickness close to 0.75 millimeter generally being suitable. The thickness of the envelope 6 may advantageously be constituted by the draping of several constituent sheets of pre-impregnated composite textiles or of dry textiles which are intimately bonded by the addition of a complementary resin such as an epoxy resin.

It must be considered that the technological characteristics of the sheets of composite textiles and the pre-impregnation or impregnation resins are known to those skilled in the art as far as the conditions of implementation are concerned.

The box structure 3 is made, in similar manner to box structure 2, from the same constituent products and consequently comprises a core 7 closely surrounded by and bonded to an envelope 8 partly defining the common wall 4. The thickness of the envelope 8 and that of the common wall 4 are preferably greater than that of the envelope 6 and, for example, included between 2 and 3 millimeters, a thickness of 2.5 millimeters being particularly suitable.

The box structure 3 is produced so that, by the annular outer periphery 9 that it defines, it forms a bearing surface of concave cross section adapted to support and retain a tire 10 of the inflatable type.

Although this has not been shown, the rim 1 may present, at least locally, an opening, passage or well, for example made in the plane of symmetry P–P', to allow, if necessary, a valve for inflating the tire 10.

The rim described in FIG. 1 is characterized by the association of two box structures of solid, closed type, adjacent each other and joined, each comprising a core and an outer envelope closely and intimately bonded thereto.

Such a structure is characterized by a high mechanical strength, with maximum lightness, particularly by reason of the choice of the structural material and its low density.

The character of undeformability is completed by a resistance to chemical aggressions, rendering the rim not subject to deterioration.

It should be noted that the envelope 8 defines, between wall 9 and wall 4, two lateral walls or flanks 11 stiffening the box structure 3 and which may advantageously be used as friction areas for the application of brake blocks, if necessary.

FIG. 2 shows a variant embodiment wherein the box structure 2 is formed by two elementary box structures 2a and 2b which are separated by a common wall 12. In this embodiment, the rim 1 comprises three successive box structures disposed radially, box structure 3 still performing the function of support for the tire 10 and of presenting side walls 11 for possible braking.

FIG. 3 shows a second variant embodiment, in which the box structure 2 defining the rim body is constituted by two elementary box structures $2_1$ and $2_2$ which, this time, are juxtaposed on either side of a common wall 12 which they define and which is located in plane P–P'. The wall 12 is constituted as described hereinbefore and is joined to the wall 4 common to box structure 2 and to box structure 3.

FIG. 4 shows another embodiment of the box structure 3 which may be retained whatever the embodiment of box structure 2 or even an association of box structures 2a, 2b or $2_1$, $2_2$.

In this embodiment, box structure 3 is of the open type and is defined by wall 4 and the two lateral flanks 11 which are shaped at their ends to present two inner shoulders 13 adapted to allow beads 14 of a conventional inflatable tire 10, associated, or not, with an inner tube, to be positioned and retained. In this case, the rim section is completed by a recess 15 in the core 7, so as to define to some extent a section bottom 16 on which, for example, an air tube within the tire 10 may bear.

A rim of the type described hereinabove may be used for constituting a wheel comprising a hub (not shown in the drawings), to which the rim is connected by an appropriate means, such as rods 20 shown in FIG. 1. It is obvious that rods 20 may be replaced by a fairing 21 or by spokes 22. In such a case, as illustrated in FIG. 5, it is advantageous to provide the rim, whatever the structure presented, with passages 25 opening out and traversing right through the rim, for example in plane P–P', for the positioning of spokes of which the screwed heads may occupy recesses 26 made coaxially to passages 25, more particularly in the outer peripheral box structure 3.

Such recesses advantageously allow the head nut (not shown) of a spoke to abut during tightening either on the outer wall 9 or on the adjacent wall 4 which is in any case made in order to be located concentrically to the axis of the wheel.

A preferred application of the invention lies in the constitution of racing cycle wheels.

The invention is not intended to be limited to the examples described and shown, as various modifications may be made without departing from the scope thereof.

What is claimed is:

1. A wheel rim for cycles and the like comprising:

a first box structure constituted by a first core formed of cellular material and a rigid first envelope formed of composite textiles of impregnated and polymerized synthetic fibers which houses and is bonded to said first core, said first box structure defining an outer radial peripheral rim section adapted to mountably receive a tire; and a second box structure constituted by a second core formed of cellular material and a rigid second envelope formed of a composite textile of impregnated and polymerized synthetic fibers which surrounds and is bonded to said second core, said second envelope being integrally formed with said first envelope and including a common wall portion with said first envelope, said second box structure being located radially inward of said first box structure and defining a rim body section.

2. The rim of claim 1, wherein said first box structure is of the closed type and includes an outer peripheral wall, said outer peripheral wall defining a bearing surface of concave cross section adapted for receiving a tire of the tubeless type.

3. The rim of claim 1, wherein said first box structure is of the open type and includes a section bottom and two internally shouldered flanks for receiving the beads of a tire of the type with an inner tube.

4. The rim of claim 3, wherein the section bottom is defined by the first core of cellular material, said cellular material comprising a rigid plastic foam.

5. The rim of claim 1, wherein said first and second box structures are traversed by through passages for the assembly of spokes for connection of said rim to a hub.

6. The rim of claim 1, further comprising a third box structure located radially inward of an integrally formed with said second box structure.

7. The rim of claim 1, further comprising a third box structure located radially inward of said first box structure, juxtaposed said second box structure, said third box structure including a first common wall portion with said first box structure and a second common wall portion located in a central transverse plane of said rim with said second box structure.

* * * * *